United States Patent Office 3,695,933
Patented Oct. 3, 1972

3,695,933
PROCESS FOR THE PRODUCTION OF A DEFATTED STARCH CONVERSION PRODUCT
Irving F. Deaton, La Grange, Ill., assignor to CPC International Inc.
No Drawing. Filed Aug. 12, 1970, Ser. No. 63,263
Int. Cl. C13k 1/06
U.S. Cl. 127—32                          9 Claims

ABSTRACT OF THE DISCLOSURE

Process for the production of a defatted starch conversion product which comprises heating a starch conversion liquor having a solids content of from about 10% to about 50% by weight and a D.E. of from about 1 to about 20 on a dry basis to a temperature of from about 212° F. to about 300° F.; defatting the heated liquor to a fat content below about 0.3% on a dry basis.

---

This invention relates to a process for the production of starch conversion products and more particularly relates to defatted starch conversion products which have been subsequently dried.

Starch conversion products which are prepared by the hydrolysis of starch have found increasing utility in the food industry. These products are used in the form of solid powders or aqueous syrups as additives in the preparation of soups, sauces, and a variety of baked and confectionery goods. These starch conversion products perform the function of bulking agents, bodying agents, thickeners, extenders, and the like.

In the preparation of starch conversion syrups, removal of residual fatty and proteinaceous materials is practiced to render subsequent decolorization more efficient or to render the syrups suitable for commercial uses in foods, adhesives, and the like. In the commonly employed methods of filtration and centrifugation at atmospheric pressures and temperatures below 170° F., operations are difficult and result in a loss of carbohydrates. Furthermore, these conditions require the use of large size equipment, and, particularly in the case of centrifuges, is ineffective.

It has now been found that starch conversion products have exceedingly low dextrose equivalents (hereinafter referred to as D.E.) and which form aqueous syrups of improved clarity can be readily prepared by a process which does not require extensive refining steps.

The term dextrose equivalent (D.E.) is used herein to refer to the reducing sugars content of the dissolved solids in a starch conversion liquor or the reducing sugars content of a solid product itself expressed as percent dextrose, as measured by the Luff-Schorl method (NBS Circular C–40, page 195, as appearing in "Polarimetry, Saccharimetry and Sugars," authors Frederick J. Bates and Associates).

The products prepared by the process of the present invention are starch conversion products having a D.E. of from about 1 to about 20 and preferably a D.E. of from about 2 to about 15 and a fat content below about 0.3% by weight and preferably below about 0.1% by weight. The products prepared in accordance with the process of this invention further exhibit 100% cold water solubility.

In its broadest scope, the process of the present invention comprises heating a starch conversion liquor and defatting the heated liquor. More specifically, the process of this invention for the production of a defatted starch conversion product comprises heating a starch conversion liquor having a solids content of from about 10% to about 50% by weight and a D.E. of from about 1 to about 20, on a dry basis, to a temperature of from about 212° F. to about 300° F.; and defatting the heated liquor to a fat content below about 0.3% on a dry basis.

In a preferred embodiment of this invention, the process comprises heating a starch conversion liquor having a solids content of from about 10% to about 50% by weight and a D.E. of from about 2 to about 15, on a dry basis, to a temperature from about 212° F. to about 300° F. under superatmospheric pressure, defatting the heated liquor to a fat content below about 0.2% by weight on a dry basis; and drying the resulting product.

Utilization of the preferred process of this invention results in a novel defatted starch conversion product having a D.E. of from about 2 to about 15 and a fat content below about 0.2% by weight.

The starch conversion liquors, which are used as the starting materials for the process of this invention, are prepared by hydrolyzing starch to a D.E. of from about 1 to about 20 or, preferably, from about 2 to about 15. The initial starch, which is subjected to hydrolysate treatment, may be derived from a wide variety of starchy materials, such as cereal starches, waxy starches, and/or root starches. Typical of these groups are corn starch, potato starch, tapioca starch, grain sorghum starch, waxy milo starch, waxy maize starch, and the like.

The starch conversion liquors or starch hydrolysates, can be prepared by various specific methods. In one method, referred to in Example I as Method A, a starch from dent corn is treated with a single enzyme application of bacterial alpha-amylase. More specifically, an aqueous slurry of a starch, having a solids content less than about 50%, is subjected to the hydrolytic action of bacterial alpha-amylase under suitable conditions to produce a starch hydrolysate.

The same product as described above, may also be made via a number of other routes. For example, a mixture of starch and water having a solids content less than 50% may be first subjected to the hydrolytic action of a bacterial alpha-amylase followed by a high temperature heating step to solubilize any insoluble starch. Since this temperature tends to inactivate the enzyme it is then necessary to cool the solubilized partial hydrolysate and subject it to a second hydrolysis by treatment with additional bacterial alpha-amylase to obtain the final starch hydrolysate. This method is referred to as Method B in Example I.

A third method of making the preferred class of low D.E. starch hydrolysates referred to as Method C in Example I consists of hydrolyzing a mixture of starch and water by the action of acid to reach a D.E. between about 5 and about 10. The partial hydrolysate can be subsequently subjected to the action of bacterial alpha-amylase to obtain a starch hydrolysate having a D.E. of from about 10 to about 20.

The following example more specifically illustrates the preparation of the starch conversion syrups from which the products of this invention can be prepared. All percentages are by weight and temperatures are in degrees Fahrenheit unless otherwise stated.

EXAMPLE I

The following specific procedures illustrate the above-described three basic methods for making the low D.E. starch hydrolysate used in this invention, and their use in producing products in accordance with the present invention.

Method A.—One-step enzyme technique

An aqueous starch slurry is prepared containing 30% solids by weight of dent corn starch. The pH of the slurry is adjusted to from about 6.5 to about 8.0. A bacterial alpha-amylase is added; for example, 0.05% dry basis Miles HT-1000. The temperature of the slurry is raised and held between 80° C. and 95° C. The mixture is held at this temperature for about one-half to two hours. The temperature can then be reduced to below 80° C. and the conversion is allowed to continue until the desired D.E. is reached. The conversion is terminated by lowering the pH of the conversion product to about 4.0 to 5.0 with the addition of dilute hydrochloric acid solution.

Method B—Two-step enzyme-enzyme technique

Unmodified corn starch is slurried in water to provide an aqueous suspension containing 28–32% by weight of the unmodified corn starch. The pH is 6.5–8.0. To this mixture is added bacterial alpha-amylase (such as HT-1000, produced and marketed by Miles Chemical Laboratories) in an amount of 0.05% based on starch solids. This starch suspension is added over a 30 minute period to an agitated tank maintained at a temperature of 80°–95° C. After completion of starch addition, liquefaction is continued for about 60 minutes, after which time the hydrolysate is within the D.E. range of 2 to 5. The liquefied starch is then heated to 150° C. and held at this temperature for 8 minutes. The heat treatment destroys residual enzyme activity and results in improved filtration rates and in decreased yield losses upon filtration of the final hydrolysate. The liquor is then cooled to 80°–90° C., redosed with enzyme, and allowed to convert to the desired D.E.

Mechod C—Two-step, acid-enzyme technique

A sample of dent corn starch is slurried in water to a concentration ranging from 14° to 22° Bé. This slurry is acid hydrolyzed to 5 D.E. After acid hydrolysis, the slurry is neutralized to a pH between 6 and 7. The neutralized liquor is cooled to between 80° C. and 90° C., and dosed with bacterial alpha-amylase (HT-1000) and allowed to convert to a final D.E. of 10 to 20 is obtained in each of the samples in a period of time between 1 and 3 hours.

As previously indicated, the starch conversion liquor heretofore described is first heated to a temperature from about 212° F. to about 300° F. The process can be effectively carried out over this entire temperature range under superatmospheric pressure. This pressures which can be utilized are those which are required to heat the aqueous starch conversion liquor to the particular temperature desired above the boiling point of the system. The heating step can be conveniently performed in an autoclave or a heat exchanger, or by injection of steam.

When the starch conversion liquor has been heated to the desired temperature, defatting of the heated liquor is carried out. This defatting step can comprise defatting by decantation, defatting by centrifuging, or defatting by filtering. Decantation can be accomplished by drawing off the liquor from the bottom of the pressure vessel while leaving a remainder of the fat portion in the vessel.

The preferred method of defatting the heated liquor in the process of this invention comprises centrifuging the liquor or subjecting the liquor to filtration, while maintaining the temperatures heretofore described. Centrifuging the heated liquor can be carried out by conventional equipment, such as a pressurized supercentrifuge.

As indicated, filtration of the heated starch conversion liquor can be readily used to effect the defatting step of the process of this invention. This filtration comprises passing the heated liquor through a filter bed, such as diatomaceous earth, attapulgite, fuller's earth, or the like. The defatting of the starch conversion liquor is carried out such that the fat content of the resulting product is below about 0.3% on a dry basis and is preferably below about 0.2% by weight on a dry basis. In many instances, a product having a fat content below about 0.1% can be readily obtained.

Upon completion of the defatting step of the process of this invention, the resulting product can be used as such as an intermediate for the preparation of specialized highly refined products or can be subjected to spray drying. Spray drying generally consists of dispersing the conversion product into a heated moving air chamber. Spraying or atomizing of the conversion product can be accomplished, for example, by using high pressure spraying nozzles or by the use of a closely perforated centrifugal spinner rotated at high speeds. This centrifugal spinner, usually in the form of a revolving disk or turbine, is capable of delivering the conversion syrup into a heated air chamber in the form of finely divided droplets which, upon drying, will result in a product having a particle size range of from about 5 to about 100 microns.

The spray drying conditions will depend, in part, upon the properties desired in the final product, particularly the moisture content of the product. In general, the conversion liquor supplied to the spray dryer can be utilized at the temperatures at which it is obtained after the fat separation step. The heated air chamber can have an air inlet temperature ranging from about 250° F. to about 350° F., and the air and product exit temperature can range from about 150° F. to about 250° F. to result in a solid product of low moisture content. Under these conditions, a typical spray dried product generally comprises from about 90% to about 99% dry substance.

When the defatted product of this invention is used as an intermediate for preparing a more refined product, the defatted product may be processed further by treatment with activated carbon, ion exchange resins, electrodialysis, etc. If a product of higher D.E. or special carbohydrate composition is desired, the defatted product may be cooled and subjected to the action of one or more specialized enzymes or enzyme systems, such as malt, malt diastase, pancreatin, glucoamylase, alpha-halo-amylase, and the like.

The process of the present invention is more specifically illustrated in the following examples.

EXAMPLE II

Preparation of a defatted low D.E. starch conversion product

A starch conversion liquor having been prepared by acid conversion in accordance with the procedures detailed in Example I, having a solids content of 11.1% by weight, and a D.E. of 10.9 on a dry basis was heated in an autoclave to a temperature of from about 250° F. to about 260° F. for a period of about 60 minutes. After this time, the fat was decanted by drawing off the conversion liquor from the bottom of the autoclave. This defatted liquor was then sprayed through a high pressure nozzle at 4,000 p.s.i.g. into a heated air chamber having an air inlet temperature of 330° F. and an air outlet temperature of 251° F. The resulting product had a solids content of 97.3% by weight and a fat content of 0.03% by weight.

EXAMPLE III

Preparation of a defatted low D.E. starch conversion product

A starch conversion liquor having been prepared by enzyme conversion in accordance with the procedures detailed in Example I, having a solids content of 27.2% by weight and a D.E. of 2.5 on a dry basis was heated in an autoclave to a temperature of from about 250° F. to about 260° F. for a period of about 50 minutes. After this time the fat was decanted by drawing off the conversion liquor from the bottom of the autoclave. This defatted liquor was then subjected to spray drying by spraying the liquor through a high pressure nozzle at 4,000 p.s.i.g. into a heated air chamber having an air inlet temperature of 345° F. and an air outlet temperature of 259° F. The resulting product had a solids content of 97.5% by weight and a fat content of 0.10% by weight.

EXAMPLE IV

Preparation of a defatted low D.E. starch conversion product

A starch conversion liquor having been prepared by enzyme conversion in accordance with the producers detailed in Example I, having a solids content of 25.1% by weight and a D.E. of 10.7 on a dry basis was heated in an autoclave to a temperature of from about 250 F. to about 260° F. for a period of about 30 minutes. After this time the fat was decanted by drawing off the conversion liquor from the bottom of the autoclave. This defatted liquor was then subjected to spray drying. The spray drying was effected by spraying the liquor through a high pressure nozzle at 4,000 p.s.i.g. into a heated air chamber having an air inlet temperature of 337° F. and an air outlet temperature of 250° F. The resulting product had a solids content of 97.6% by weight and a fat content of 0.05% by weight.

EXAMPLE V

Preparation of a defatted low D.E. starch conversion product

A starch conversion liquor having been prepared by acid-enzyme conversion in accordance with the procedures detailed in Example I, having a solids content of 29.1% by weight and a D.E. of 21.2 on a dry basis was heated in an autoclave to a temperature of from about 250° F. to about 260° F. for a period of about 60 minutes. After this time the fat was decanted by drawing off the conversion liquor from the bottom of the autoclave. This defatted liquor was then subjected to spray drying by spraying the liquor through a high pressure nozzle at 4,000 p.s.i.g. into a heated air chamber having an air inlet temperature of 331° F. and an air outlet temperature of 250° F. The resulting product had a solids content of 97.7% by weight and a fat content of 0.021% by weight.

EXAMPLE VI

Preparation of a defatted low D.E. starch conversion product

A starch conversion liquor having been prepared by acid conversion in accordance with the procedures detailed in Example I, having a solids content of 28.1% by weight, and a D.E. of 7.9 on a dry basis was heated in an autoclave to a temperature of 263° F. The heated liquor was then passed through a pressure filter using a diatomaceous filter bed while maintaining the temperature between about 250° F. and about 260° F. The filtrate was then subjected to spray drying by spraying the liquor through a high pressure nozzle at 4,000 p.s.i.g. into a heated air chamber having an air inlet temperature of about 330° F. and an air outlet temperature of about 250° F. The resulting product had a solids content of 95.3% by weight, and a fat content of 0.06% by weight.

EXAMPLE VII

Preparation of a defatted low D.E. starch conversion product

A starch conversion liquor having been prepared by enzyme conversion in accordance with the procedures detailed in Example I, having a solids content of 29.1% by weight, and a D.E. of 2.5 on a dry basis was heated in an autoclave to a temperature of 257° F. The heated liquor was then passed through a pressure filter using a diatomaceous filter bed while maintaining the temperature between about 250° F. and 260° F. The filtrate was then subjected to spray drying. The resulting product had a solids content of 97.7% by weight and a fat content of 0.05% by weight.

EXAMPLE VIII

Preparation of a defatted low D.E. starch conversion product

A starch conversion liquor having been prepared by acid-enzyme conversion in accordance with the procedures detailed in Example I, having a solids content of 29.9% by weight, and a D.E. of 15.6 on a dry basis was heated in an autoclave to a temperature of 260° F. The heated liquor was then passed through a pressure filter using a diatomaceous filter bed while maintaining the temperature between about 250° F. and about 260° F. The filtrate was then subjected to spray drying. The resulting product had a solids content of 94.4% by weight, and a fat content of 0.06% by weight.

EXAMPLE IX

Preparation of a defatted low D.E. starch conversion product

A starch conversion liquor having been prepared by acid conversion in accordance with the procedures detailed in Example I, having a solids content of 29.4% by weight, and a D.E. of 21.2 on a dry basis was heated in an autoclave to a temperature of 260° F. The heated liquor was then passed through a pressure filter using a diatomaceous filter bed while maintaining the temperature between about 250° F. and about 260° F. The filtrate was then subjected to spray drying. The resulting product had a solids content of 94.0% by weight, and a fat content of 0.04% by weight.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A process for the production of a defatted starch conversion product which comprises heating a starch conversion liquor having a solids content of from about 10% to about 50% by weight and a D.E. of from about 1 to about 20 on a dry basis to a temperature of from about 212° F. to about 300° F. under superatmospheric pressure; and defatting the heated liquor to a fat content below about 0.3% on a dry basis.

2. The process of claim 1 which comprises heating a starch conversion liquor having a solids content of from about 10% to about 50% by weight and a D.E. of from about 2 to about 15 on a dry basis to a temperature of from about 212° F. to about 300° F. under superatmospheric pressure; and defatting the heated liquor by centrifuging the liquor at a temperature of from about 212° F. to about 300° F. under superatmospheric pressure to a fat content below about 0.2% on a dry basis.

3. The process of claim 1 which comprises heating a starch conversion liquor having a solids content of from about 10% to about 50% by weight and a D.E. of from about 2 to about 15 on a dry basis to a temperature of from about 212° F. to about 300° F. under superatmospheric pressure; and defatting the heated liquor to a fat content below about 0.2% by weight on a dry basis by filtering the liquor under superatmospheric pressure through a bed of diatomaceous earth.

4. A process for the production of a defatted starch conversion product which comprises heating a starch conversion liquor having a solids content of from about 10% to about 50% by weight and a D.E. of from about 1 to about 20 on a dry basis to a temperature of from about 212° F. to about 300° F. under superatmospheric pressure; defatting the heated liquor to a fat content below about 0.3% on a dry basis; and drying the resulting product.

5. The process of claim 4 which comprises heating a starch conversion liquor having a solids content of from about 10% to about 50% by weight and a D.E. of from about 2 to about 15 on a dry basis to a temperature of from about 212° F. to about 300° F. under superatmospheric pressure; defatting the heated liquor by centrifuging the liquor at a temperature of from about 212° F. to about 300° F. under superatmospheric pressure to a fat content below about 0.2% on a dry basis; and spray drying the resulting product.

6. The process of claim 4 which comprises heating a starch conversion liquor having a solids content of from about 10% to about 50% by weight and a D.E. of from about 2 to about 15 on a dry basis to a temperature of from about 212° F. to about 300° F. under superatmospheric pressure; defatting the heated liquor to a fat content below about 0.2% by weight on a dry basis by filtering the liquor under superatmospheric pressure through a bed of diatomaceous earth; and spray drying the filtrate.

7. A defatted starch conversion product having a D.E. of from about 2 to about 15 and a fat content below about 0.2% by weight said defatted starch conversion syrup product exhibiting a cold water solubility of about 100%.

8. The defatted starch conversion product of claim 7, wherein the fat content is below about 0.1% by weight.

9. The defatted starch conversion product of claim 7, wherein the product has a dry substance of from about 90% to about 99%.

References Cited

UNITED STATES PATENTS

| 2,149,517 | 3/1939 | Fleming | 127—30 |
| 2,192,951 | 3/1940 | Wolff | 127—29 |
| 2,332,758 | 10/1943 | Schopmeyer | 127—40 |
| 2,433,818 | 12/1947 | Schopmeyer | 127—29 X |
| 2,965,520 | 12/1960 | Snyder | 99—142 X |
| 3,490,922 | 1/1970 | Hurst | 99—142 |
| 3,519,492 | 7/1970 | Walon | 99—142 X |
| 3,560,343 | 2/1971 | Armbuster | 195—31 R |
| 3,586,513 | 6/1971 | Horn | 195—31 X |

FOREIGN PATENTS 991,500   5/1965   Great Britain.

MORRIS O. WOLK, Primary Examiner

S. MARANTZ, Assistant Examiner

U.S. Cl. X.R.

99—142; 127—40, 53, 56